(12) United States Patent
Swamy et al.

(10) Patent No.: US 8,605,704 B2
(45) Date of Patent: Dec. 10, 2013

(54) METHOD AND DEVICE FOR PAGING AND MEDIA SERVICES ON A SINGLE CARRIER FREQUENCY

(75) Inventors: Satish Nanjunda Swamy, Krn (IN); Padmaja Putcha, Gurnee, IL (US); Sandeep V. Vishnu Ramdurg, Krn (IN)

(73) Assignee: Motorola Mobility LLC, Libertyville, IL (US)

( * ) Notice: Subject to any disclaimer, the term of this patent is extended or adjusted under 35 U.S.C. 154(b) by 745 days.

(21) Appl. No.: 12/342,408

(22) Filed: Dec. 23, 2008

(65) Prior Publication Data
US 2010/0157969 A1    Jun. 24, 2010

(51) Int. Cl.
*H04J 1/00*    (2006.01)

(52) U.S. Cl.
USPC ........... 370/343; 370/312; 370/329; 370/338; 370/432; 455/515

(58) Field of Classification Search
USPC ......... 370/252, 312, 328, 329, 338, 313, 432; 455/450, 452.1, 515, 414.1
See application file for complete search history.

(56) References Cited

U.S. PATENT DOCUMENTS

| | | | |
|---|---|---|---|
| 7,197,333 B2 | 3/2007 | Hwang | |
| 7,239,880 B2 | 7/2007 | Shaheen | |
| 7,242,919 B2 | 7/2007 | Kim | |
| 7,450,933 B2 * | 11/2008 | Kwak et al. | 455/414.1 |
| 8,131,273 B2 * | 3/2012 | Lee et al. | 455/414.1 |
| 2006/0274712 A1 | 12/2006 | Malladi | |
| 2007/0191020 A1 | 8/2007 | Fischer | |
| 2008/0020763 A1 * | 1/2008 | Fischer | 455/435.1 |
| 2008/0233974 A1 * | 9/2008 | Xu | 455/458 |
| 2008/0268878 A1 * | 10/2008 | Wang et al. | 455/458 |
| 2008/0311892 A1 * | 12/2008 | Lee et al. | 455/414.1 |
| 2008/0311926 A1 * | 12/2008 | Fischer et al. | 455/452.1 |
| 2009/0207774 A1 * | 8/2009 | Lee et al. | 370/312 |

OTHER PUBLICATIONS

Orange, T-Mobile, NTT DoCoMo, "Inputs from Operators on eMBMS Deployment Scenarios and State 2 Issues", 3GPP TSG-RAN WG2 Meeting #60 R2-075160, Nov. 5-9, 2007, 5 pages, Jeju, South Korea.

* cited by examiner

Primary Examiner — Christopher Grey

(57) ABSTRACT

Methods enable a paging service and a media service to be carried on a single carrier frequency. The methods includes: determining to send a paging record to a communication device for a first media service, wherein the first media service is provided on a first carrier frequency; inserting the paging record into a first message generated using a protocol that is also used to provide a second different media service to the communication device on a second different carrier frequency; providing a paging indication using the protocol; and sending the paging indication and the first message with the paging record over the second carrier frequency. The protocol can be a multimedia broadcast service (MBMS) protocol. The paging indication alerts the communication device to monitor the second carrier frequency for the paging record.

5 Claims, 5 Drawing Sheets

500

| MESSAGE TYPE | —502 |
| MODIFIED SERVICE LIST | —504 |
| MBMS TRANSMISSION – IDENTITY PAGING | —506 |
| PAGING RECORD LIST | —508 |
| PAGING RECORD | —510 |
| MBMS TRANSMISSION IDENTITY - MBMS | —512 |
| MBMS REQUIRED UE ACTION | —514 |
| MBMS PREFERRED FREQUENCY | —516 |
| PFL INDEX | —518 |
| PFL INFO | —520 |
| MBMS DISPERSION INDICATOR | —522 |
| CONTINUE MCCH READING | —524 |
| MBMS RE-ACQUIRE MCCH | —526 |
| MBMS DYNAMIC PERSISTENCE LEVEL | —528 |
| END OF MODIFIED MCCH INFORMATION | —530 |
| MBMS NUMBER OF NEIGHBOUR CELLS | —532 |
| MBMS ALL UNMODIFIED P-T-M SERVICES | —534 |

MBMS MODIFIED SERVICE INFORMATION MESSAGE FRAME

*FIG. 5*

METHOD AND DEVICE FOR PAGING AND MEDIA SERVICES ON A SINGLE CARRIER FREQUENCY

FIELD OF THE DISCLOSURE

The present disclosure relates generally to a wireless communication network and more particularly to a method and apparatus for facilitating a paging service and a media service on a single carrier frequency in a wireless communication network

BACKGROUND

Various media services for the distributions of media such as audio, video and data are offered in wireless communication networks. There are single media services for distributing one type of media and multimedia services for distributing multiple types of different media. In addition, wireless communication networks offer both point-to-point media distribution (i.e., unicast distribution) and point-to-multipoint distribution (e.g., broadcast or multicast distribution). Moreover, a network offering two different types of media services may provide those media services on two different carrier frequencies, wherein a carrier frequency is the channel or physical radio frequency (RF) resources over which the media is transported. An example of a carrier frequency band is 2100 MHz or 1900 MHz.

For instance, a wireless communication network may offer Multimedia Broadcast Multicast Service (MBMS) on one carrier frequency and a non-MBMS service on a different carrier frequency if a single carrier frequency has inadequate capacity to support both MBMS and non-MBMS services. In that case, paging notification and associated paging records for the non-MBMS services would be sent on a different carrier frequency from the carrier frequency that supports MBMS, requiring a wireless communication device to monitor two different carrier frequencies in order to receive the MBMS services and paging notifications and paging records for the non-MBMS service. To address this need, a wireless communication device could be equipped with duplicate hardware to enable the device to simultaneously monitor two different carrier frequencies. However, this would increase the costs of the wireless communication device. Alternatively, the wireless communication device could be equipped with software that enables the device to periodically move between the different carrier frequencies to monitor the two carrier frequencies but at a risk of unnecessary interruption of MBMS and/or misses paging notifications and paging records for non-MBMS services resulting in missed calls.

Accordingly, there is a need for a method and apparatus for providing on a first carrier frequency a first media service and paging service for a different media service supported by a second different carrier frequency.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is a frame format for a MBMS Modified Services Information Message in accordance with an illustrative embodiment.

Figure 1:
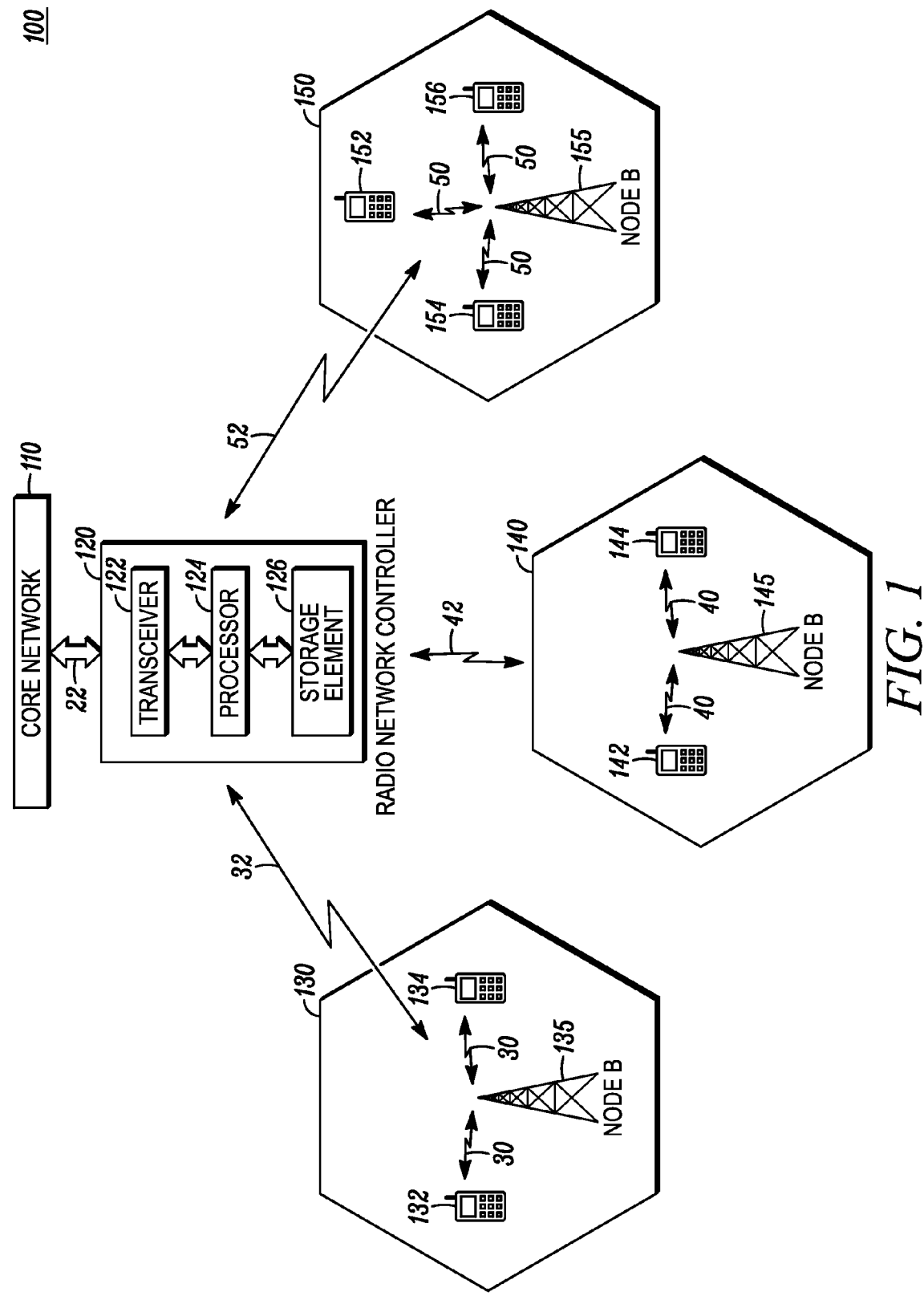
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to various embodiments, a method and device for facilitating a paging service and a media service on a single carrier frequency in a communication network is provided. Accordingly, an infrastructure device: determines that a paging record needs to be sent to a communication device for a first media service, wherein the first media service is provided on a first carrier frequency; inserts the paging record into a first message generated using a protocol that is also used to provide a second different media service to the communication device on a second different carrier frequency; provides a paging indication using the protocol, wherein the paging indication alerts the communication device to monitor the second carrier frequency for the paging record; and sends the paging indication and the first message with the paging record over the second carrier frequency. The wireless communication device receives the second media service on the second carrier frequency using the protocol; and while receiving the second media service also monitors the second carrier frequency for the paging indication and the paging record. In one illustrative embodiment, the second media service is a multimedia service such as MBMS, and the first media service is any type of non-MBMS service such as one that provides audio services. MBMS gives the opportunity to broadcast TV, film, information such as free overnight transmissions of Newspapers, etc., in a digital form and other media in an existing network. For the MBMS implementation, the first message can be carried on a MBMS control channel (MCCH), and the paging indication can be carried on a MBMS notification indicator channel (MICH). Further, both the paging indication and the paging record are associated with a common service identity to enable the communication device to identify the paging record as being of interest, wherein the service identity is one of a plurality of MBMS service identities reserved to provide a paging service for at least one non-MBMS service.

Advantages of the various embodiments include: monitoring only a single carrier frequency to facilitate receiving different communication services that are provided on different carrier frequencies; thereby enabling a device having one set of transceiver hardware to receive a particular media service on one carrier frequency and monitor for paging indications for a different service on the same carrier frequency, wherein the second service is provided on a different carrier frequency. Those skilled in the art will realize that the above recognized advantages and other advantages described herein are merely illustrative and are not meant to be a complete rendering of all of the advantages of the various embodiments.

Referring now to figures, FIG. 1 is a block diagram of a communication network 100 in accordance with some embodiments. The communication network 100 comprises a core network 110, which in the case is a universal mobile telecommunication system (UMTS) terrestrial radio access network (UTRAN), wherein the UTRAN is a combination of radio network controller (RNC) 120 and multiple Node Bs 135, 145, and 155, serving, respectively, a plurality of coverage areas 130, 140, and 150, also referred to as sites or cellular sites. The communication network 100 may comprise, but is not limited to networks such as a wideband code division multiple access (W-CDMA) network, a time division duplexing CDMA (TD-CDMA) network, a time division synchronous CDMA (TD-SCDMA) network, and an universal mobile telecommunication system (UMTS) network.

The W-CDMA is a wideband spread-spectrum mobile air interface that utilizes the direct-sequence spread spectrum method of asynchronous code division multiple access to achieve higher speeds and support more users. The TD-CDMA is an IMT (international mobile telecommunications)—2000 3G air interface. The TD-SCDMA is based on time division duplexing (TDD) and can easily accommodate asymmetric traffic with different data rate requirements on downlink and uplink by dynamically adjusting the number of timeslots used for downlink and uplink. The UMTS communication network was developed as a 3GPP (3rd Generation Partnership Project) standard to support globally applicable technical specifications and technical reports for a 3rd generation mobile system. The UMTS standard combines the features of W-CDMA, TD-CDMA, or TD-SCDMA air interfaces, global system for mobile communication's (GSM) mobile application part (MAP) core, and the GSM family of speech codecs. Of the various 3GPP releases, the 3GPP Release 6 for the UMTS network standard provides support for MBMS services. The reference to 3GPP Release 6 for the UMTS network standard used herein includes the standards and revisions mentioned above as well as subsequent revisions.

The teachings herein are not limited to UMTS networks but can be applied to other types of networks using the same or different multiplexing technologies. Such networks may include, for example, networks employing Long term evolution/evolved universal terrestrial radio access (LTE/EUTRA) or Worldwide Interoperability for Microwave Access (WiMAX) technology. In addition, only a single RNC and three cellular sites are shown for ease of illustration. However, the teachings herein can be implemented within a system comprising additional RNC and more or fewer sites.

Returning again to the description of the communication network 100, the core network 110 is basically divided into a circuit switched network, primarily for voice services and a packet switched network, primarily for data services. The circuit switched network part of the core network 110 contains a serving mobile station controller (SMSC) (not shown) and a gateway mobile station controller (GMSC) (not shown). The SMSC connects to the UTRAN system and the GMSC connects to other circuit switched networks such as but not limited to the public telephone network (PSTN) (not shown). The packet switched network part of the core network 110 contains a serving general packet radio service support node (SGSN) (not shown) and a gateway general packet radio service support node (GGSN) (not shown). The SGSN connects to the UTRAN system and the GGSN connects to other packet switched networks such as but not limited to the Internet (not shown).

The RNC 120 of the communication network 100 is at least equipped with a transceiver 122 (i.e., transmitter and receiver apparatus), a memory 126 and a processing device 124 and is further equipped with any additional components as needed for a commercial embodiment. The transceiver 122, memory 126 and processing device 124 can have any suitable physical implementation and are topologically coupled depending on the particular device implementation. These components are further operatively coupled and can be adapted, configured, and designed to allow operation to perform methods in accordance with the teachings herein, for example, as illustratively described by reference to the remaining FIGS. 2, 3, 4, and 5. Moreover, the RNC 120 can communicate with the core network 110 through a link 22 to further facilitate communications within the communication network 100.

Further referring to the communication network 100, each cellular site 130, 140, and 150 comprises at least one Node B 135, 145, and 155 and a plurality of communication devices 132, 134, 142, 144, and 152, 154, 156, respectively. The communication devices 132, 134, 142, 144, 152, 154, and 156, are also referred to as user equipment (UE). The Node Bs 135, 145, and 155 and UEs 132, 134, 142, 144, 152, 154, and 156 are also equipped with transceivers, memories, and processing devices operatively coupled to carry out their functionality, including any functionality needed to implement the teachings herein and are further equipped with any other elements needed in a commercial embodiment.

As used herein, a Node B 135, 145, 155 is an infrastructure device that can receive information (either control or media, e.g., data, voice, etc.) in a wireless signal from a RNC 120 via communication channel 22 and broadcast or multicast information to one or more UEs 132, 134, 142, 144, 152, 154, 156 via communication links 32, 42, 52. A Node B includes, but is not limited to, equipment commonly referred to as base transceiver stations, access points, routers or any other type of UE interfacing device in a wireless environment.

As referred to herein, a UE includes, but is not limited to, devices commonly referred to wireless communication devices such as mobile radios, mobile stations, subscriber units, access terminals, mobile devices, or any other device capable of operating in a wireless environment. Examples of UE include, but are not limited to, two-way radios, mobile phones, cellular phones, Personal Digital Assistants (PDAs), laptops and pagers.

Only a limited number of Node Bs and UE are shown for ease of illustration. However, network 100 can include any number of Node Bs to support any number of UE based on system requirements. Moreover, embodiments are not dependent on the protocol(s) used to facilitate communications in the system and can be used with any such protocols.

In general, communication links (also referred to herein as communication channels or channels) comprise the physical communication resources over which information is sent between different elements in the communication network 100 and can include wired links (e.g., link 22) or wireless links (e.g., 30, 32, 40, 42, 50, 52) with a wireless interface between the equipment in the network being defined by the protocols implemented in the network. For example, as illustrated in FIG. 1, the RNC 120 sends a paging indication for different media services, such as but not limited to audio media and data services to the plurality of Node Bs 135, 145, and 155, through the channels 32, 42, and 52, respectively. Furthermore, the Node Bs 135, 145, and 155 broadcast or multicast the paging information received from the RNC 120 to the UE 132, 134, 142, 144, and 152, 154, 156, through the communication links 30, 40, and 50, respectively.

In a UMTS network, each communication channel, e.g., 30, 40, and 50 comprises a set of physical channels separated by a few MHz transmitted between the UTRAN network and the user equipment within a given frequency assignment and comprises a forward channel and a reverse channel (also known in the art as downlink and uplink channels). The forward channel includes physical layer channels transmitted from the UTRAN to the user equipments, wherein the forward channel is also capable of supporting broadcast and multicast of control information and media information such as but not limited to audio media, video media, data media, and multimedia. The reverse channel includes the physical layer channels transmitted from the user equipments to the UTRAN.

The embodiments are described in the context of an UMTS system for ease of illustration. However, the embodiments are not limited to such a system but can be applied within any other system that employs multiple carrier frequencies for multiple services. Moreover, any MBMS protocol, whether standardized or proprietary, can be implemented for providing multimedia services and providing a paging service for non-MBMS services in accordance with the teachings herein. An illustrative standardized MBMS protocol includes a suite of MBMS Technical Standards (TS) documents published by 3GPP.

Figure 2:
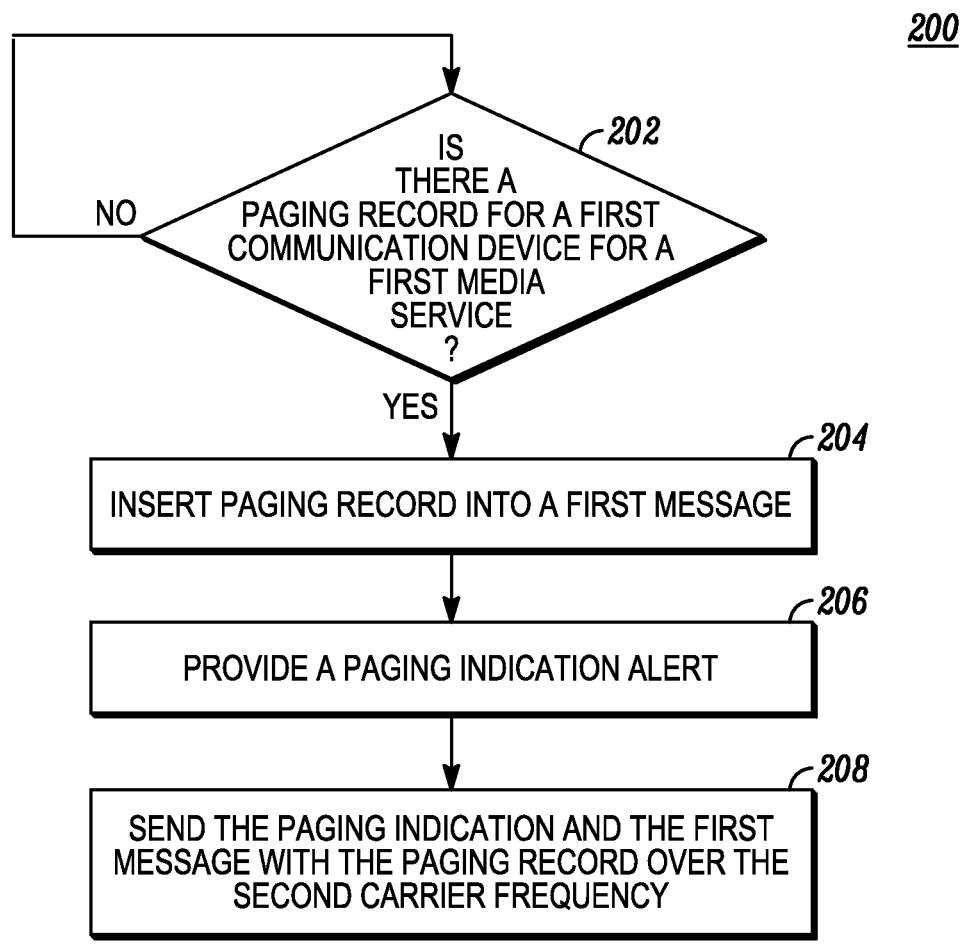
FIG. 2 is a flow diagram of a method performed in an infrastructure device for providing a first media service and a paging service for a second media service on a single carrier frequency in accordance with an illustrative embodiment.

Referring now to FIG. 2, a flow diagram is shown of a method performed in an infrastructure device for providing on the same carrier frequency a media service (such as a MBMS service) and a paging service for a different service (such as a non-MBMS service) in accordance with an illustrative embodiment. The infrastructure device can be the RNC 120 in accordance with one embodiment or the Node B 135, 145, 155 in accordance with another embodiment.

The method 200 for providing a paging service and a media service on a single carrier frequency includes determining (202) whether there is a paging record to send to a wireless communication device such as UE 132, 134, 142, 144, 152, 154, or 156 for a first media service; wherein the first media service is provided on a first carrier frequency. The first media service can be a non-MBMS service such as but not limited to a voice service or a data service, and the paging record can include at least one unique device identifier such as but not limited to an international mobile subscriber identity (IMSI) or a temporary mobile subscriber identity (TMSI). When it is determined (202) that there is a paging record for a communication device that needs to be sent, method 200 provides for inserting (204) the paging record into a first message generated using a protocol that is also used to provide a second different media service to the communication device on a second different carrier frequency. The second media service, in this illustrative embodiment, is a multimedia service such as, but not limited to, MBMS; wherein the first message is a MBMS message generated using a MBMS protocol.

The method 200 further comprises providing (206) a paging indication using the protocol used to generate the first message, wherein the paging indication alerts the communication device, e.g., 132, 134, 142, 144, 152, 154, or 156 to monitor the second carrier frequency for the paging record, and sending (208) the paging indication and the first message with the paging record over the second carrier frequency using the transceiver. In one illustrative embodiment, the paging indication comprises a plurality of bits that a communication device monitors on the channel, where in the selected bits being monitored are based on an identifier for the communication device. For example, the communication device, based on its identity, applies a formula that indicates what physical bits to monitor to determine whether it is being paged by the network.

The paging indication is sent on a MBMS notification indicator channel (MICH), and the first message with the paging record is sent on a MBMS control channel (MCCH). The paging indication and the first message with the paging record can be either broadcast or multicast by the network such as an UTRAN to the UEs 132, 134, 142, 144, 152, 154, and 156, using any suitable broadcast or multicast mechanism. An illustrative MBMS modified service information message frame 500 containing a paging record 510, inserted in accordance with method 200, is shown in FIG. 5.

The paging indication and the paging record provided at 204 and 206 are associated with a common service identity to enable the communication device to identify the paging record as being of interest, wherein the service identity is one of a plurality of MBMS service identities reserved to provide a paging service for at least one non-MBMS service. Further, the plurality of MBMS service identities are mapped to a plurality of groups of communication devices, such that each communication device is associated with only one service identity; although multiple UE that are members of the same group could, therefore, be associated with the same service entity that is mapped to the group.

Figure 3:
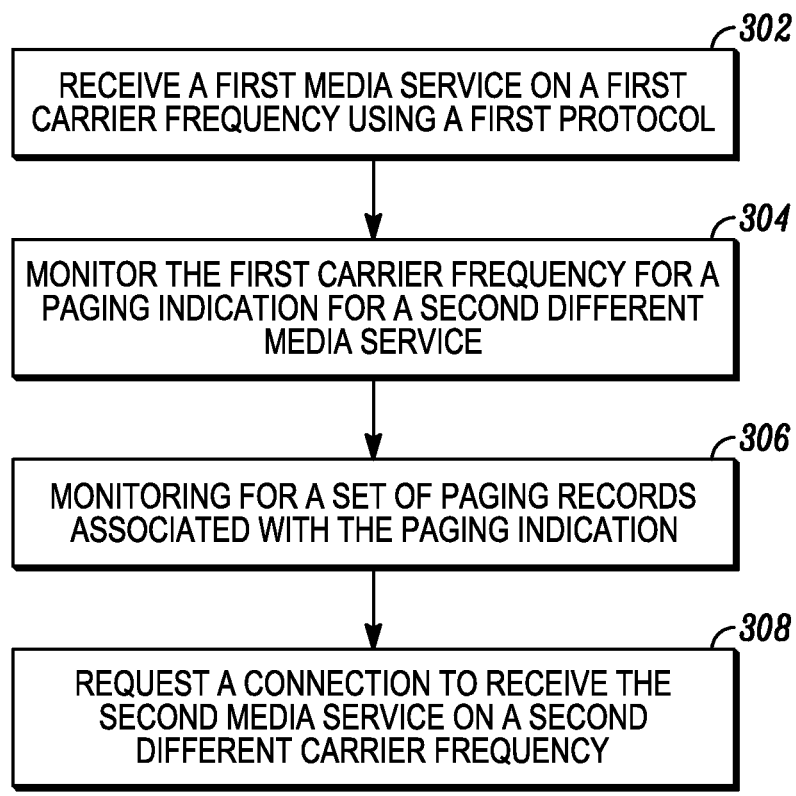
FIG. 3 is a high level flow diagram of a method performed in a wireless communication device for receiving a first media service and a paging service for a second media service on a single carrier frequency in accordance with some embodiments.

FIG. 3 is a high level flow diagram of a method performed in a wireless communication device, e.g., UE 132, 134, 142, 144, 152, 154, 156, for receiving a paging service and a media service on a single carrier frequency in accordance with some embodiments. The method 300 includes receiving (302) a first media service (e.g., MBMS) on a first carrier frequency using a first protocol (e.g., MBMS protocol) and monitoring (304) the first carrier frequency for a paging indication for a second different media service (e.g., a non-MBMS service), wherein the paging indication is also received using the first protocol. The method 300 further includes monitoring (306) for a set (one or more) of paging records associated with the paging indication and requesting (308) a connection to receive the second media service on a second different carrier frequency when the set contains a paging record of interest; which can be determined by identifying a UE identifier of interest in the paging record of interest.

Figure 4:
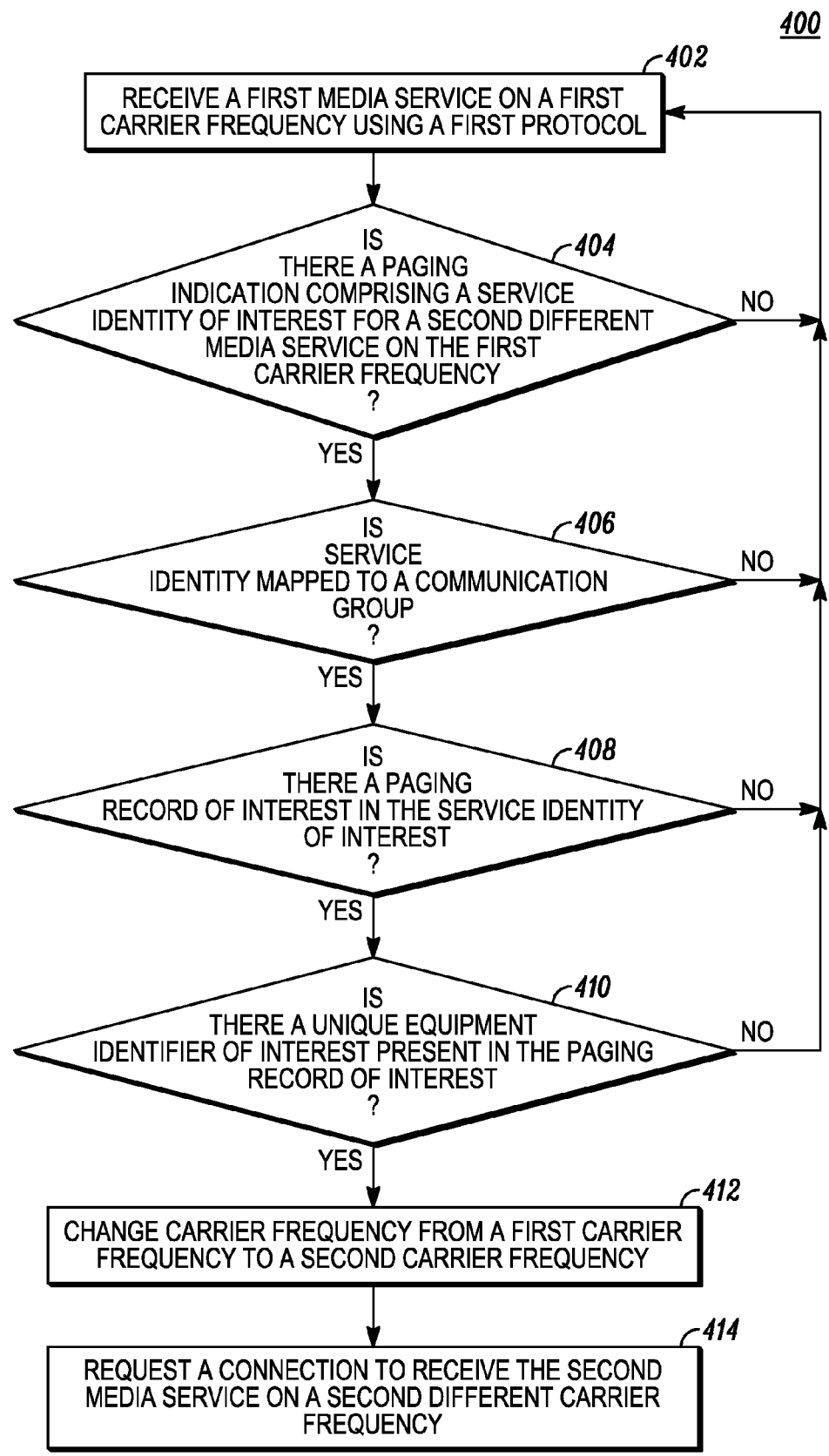
FIG. 4 is a more detailed flow diagram of a method performed in a wireless communication device for receiving a multimedia broadcast multicast service (MBMS) and a paging service for a non-MBMS service on a single carrier frequency in accordance with an illustrative embodiment.

FIG. 4 is a more detailed flow diagram of a method 400 performed in a wireless communication device, such as a UE 132, 134, 142, 144, 152, 154, or 156, for receiving MBMS and a paging service for a non-MBMS service on a single carrier frequency in accordance with an illustrative embodiment In accordance with method 400, while receiving (402) MBMS using the MBMS protocol on a given carrier frequency, the UE monitors (404) the same carrier frequency for a paging indication of interest for a non-MBMS service. The MBMS protocol published by 3GPP provides for: a MBMS Modified Service Information message in which can be embedded a paging record for the UE; a MBMS notification indicator channel (MICH) over which the paging indication can be carried; and a MBMS control channel (MCCH) over which the MBMS message can be carried.

Furthermore, as stated above, the paging indication and the paging record are associated with a common service identity of interest to enable the communication device to identify the paging record as being of interest once the paging indication of interest is detected. Accordingly, a paging service is provided for non-MBMS services, such as but not limited to audio service e.g., a voice call in the communication network 100, or data services.

In one example as illustrated in FIG. 1, the UE 132 and 134 present in the cellular site 130 can form one communication group, and the UE 142 and 144 present in the cellular site 140 can combine with the UE 152 present in the cellular site 150 to form a second communication group. Further, the paging indication for the above mentioned first and the second communication group may include the service identities 'A' and 'B', such that the service identity 'A' is mapped to the first communication group comprising the UEs 132 and 134 and the service identity 'B' is mapped to the second communication group comprising the UEs 142, 144, and 152.

Thus, upon learning, via any means such as being pre-provisioned, of the service identity ('A' or 'B') of interest that is mapped to a particular communication group to which the UE belongs, each UE (e.g. 132, 134, 142, 144, or 152) present in the communication group monitors (404) the MICH for paging indications and as paging indications are detected, determines (406) whether the paging indication includes the service identity of interest mapped to the group of interest for the UE. Upon finding a paging indication with the service identity of interest, the UE monitors (408) the MCCH for the MBMS Modified Service Information message that includes the paging record of interest (i.e., the paging record associated with the service identity of interest) from a set of paging records included in the MBMS message. Each paging record includes at least one unique device identifier such as but not limited to an IMSI or a TMSI. Thus, upon detecting a paging record of interest having the service identity of interest, the UE 132, 134, 136, 142, 144, or 152 monitors (410) for a unique equipment identifier of interest present in the paging record of interest. Upon finding the unique device identifier of interest, the corresponding UE (any one of 132, 134, 136, 142, 144, or 152) changes (412) its carrier frequency from the first carrier frequency to a second different carrier frequency and sends (414) a connection request 414 to the UTRAN to receive the second media service on the second carrier frequency.

FIG. 5 is a frame format for a MBMS Modified Services Information message as sent by the UTRAN to a UE in accordance with an illustrative embodiment of the present invention. The MBMS Modified Services Information message frame 500 comprising a plurality of fields transmitted periodically by the UTRAN to inform the UEs 132, 134, 142, 144, 152, 154, 156 about a change applicable for one or more MBMS services available in the current cell and possibly in the neighboring cells of the communication network 100. Frame 500 may be transmitted by the UTRAN through a dedicated control channel (DCCH) the MCCH to the UEs.

In accordance with one embodiment, the frame 500 comprises the following fields: a message type field 502 for encapsulating all the channel specific messages such as DCCH messages or MCCH messages; a modified service list 504 comprising a list of one or more MBMS services available in the current cell and in neighboring cells; a MBMS transmission identity paging 506 that identifies whether a particular MBMS transmission has already been received; a paging record list 508, which is included in the message frame 500 when there is a paging indication on the MICH channel; a paging record 510 comprising at least one of the IMSI or TMSI identifiers; a MBMS transmission identity-MBMS 512 comprising at least one of the MBMS service identities and a MBMS session identity; a MBMS required UE action field 514 specifying an action to be performed by a UE on receiving the MBMS frame 500; a MBMS preferred frequency field 516 defining the frequency that the UE shall consider as the preferred frequency for cell reselection during a session for an MBMS service the UE has joined.

The frame 500 further includes: a PFL (Preferred Frequency List) index field 518 pointing to an entry in a list in MBMS general information; a PFL info field 520 specifying uplink and downlink frequency details; a MBMS dispersion indicator 522 for specifying whether or not the UE should attempt a cell selection on a different frequency other than the current frequency; and a continue MCCH reading field 524 indicating whether or not the UE should continue reading the MCCH in the next modification period. Further, the fields: MBMS re-acquire MCCH 526 indicates to the UE to perform a MCCH acquisition; MBMS dynamic persistence value 528 gives information about call setup delays; End of Modified MCCH information 530 indicates to the UE that all the MCCH information preceding the MBMS unmodified services information message is transmitted within an indicated transmission time interval; MBMS number of neighbor cells 532 indicates the number of MBMS NEIGHBOURING CELL P-T-M RB INFORMATION messages that are contained within a MCCH transmission; and MBMS all unmodified p-t-m services 534 indicates to a UE to re-acquire the PtM (Point to Multipoint) information for all services listed in the message MBMS UNMODIFIED SERVICES INFORMATION, when the "MBMS required UE action" field is set to "Acquire PTM RB info". It should be noted that the format of the message carrying the paging records can vary from this illustrative embodiment depending on the specifics of the protocol being used to generate the message.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing a paging service, the method comprising:
   determining to send a paging record to a communication device, the paging record for a first media service, wherein the first media service is provided on a first carrier frequency;
   inserting the paging record into a first message, the first message generated using a protocol that is also used to provide a second media service to the communication device, the second media service being a broadcast service, the second media service provided on a second carrier frequency, the first and second media services being different, and the first and second carrier frequencies being different;
   providing a paging indication for the paging record for the first media service using the protocol, wherein the paging indication alerts the communication device to monitor the second carrier frequency for the paging record for the first media service; and
   sending the paging indication and the first message with the paging record for the first media service over the second carrier frequency, wherein
   the second media service is a multimedia broadcast multicast service (MBMS), and the first media service is a non-MBMS service;
   the first message is carried on a MBMS control channel (MCCH); and
   the paging indication is carried on a MBMS notification indicator channel (MICH).

2. The method of claim 1, wherein both the paging indication and the paging record are associated with a common service identity to enable the communication device to identify the paging record as being of interest, wherein the service identity is one of a plurality of MBMS service identities reserved to provide a paging service for at least one non-MBMS service.

3. The method of claim 2, wherein the plurality of MBMS service identities are mapped to a plurality of groups of communication devices, such that each communication group is associated with only one service identity.

4. The method of clam 1 wherein sending the paging indication and the first message with the paging record comprises broadcasting or multicasting the paging indication and the first message with the paging record.

5. A device comprising:
   a processor operable for:
      determining to send a paging record to a communication device, the paging record for a first media service, wherein the first media service is provided on a first carrier frequency;
      inserting the paging record into a first message generated using a multimedia broadcast multicast service (MBMS) protocol that is also used to provide a MBMS service to the communication device, the MBMS provided on a second carrier frequency, the first and second frequencies being different, wherein the first message is carried on a MBMS control channel (MCCH), and wherein the first media service is a non-MBMS service; and providing a paging indication for the first media service using the MBMS protocol, wherein the paging indication and the paging record are associated with a common service entity selected from a plurality of MBMS service entities and that is mapped to a group of communication devices that includes the communication device to enable the communication device to find the paging record, wherein the paging indication is carried on a MBMS notification indicator channel (MICH);

a transceiver communicatively coupled to the processor for sending the paging indication and the first message with the paging record over the second carrier frequency.

* * * * *